US012236911B2

(12) United States Patent
Li et al.

(10) Patent No.: US 12,236,911 B2
(45) Date of Patent: Feb. 25, 2025

(54) DISPLAY METHOD AND DISPLAY APPARATUS

(71) Applicant: BOE Technology Group Co., Ltd., Beijing (CN)

(72) Inventors: Xiaolong Li, Beijing (CN); Kuanjun Peng, Beijing (CN); Kai Guo, Beijing (CN); Wanpeng Teng, Beijing (CN); Chunfang Zhang, Beijing (CN); Weixing Liu, Beijing (CN); Zhiqiang Xu, Beijing (CN); Tieshi Wang, Beijing (CN); Feihu Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/004,901

(22) PCT Filed: Jan. 19, 2022

(86) PCT No.: PCT/CN2022/072730

§ 371 (c)(1),
(2) Date: Jan. 10, 2023

(87) PCT Pub. No.: WO2023/137620

PCT Pub. Date: Jul. 27, 2023

(65) Prior Publication Data

US 2024/0242688 A1 Jul. 18, 2024

(51) Int. Cl.
*G09G 3/36* (2006.01)

(52) U.S. Cl.
CPC ... *G09G 3/3648* (2013.01); *G09G 2320/0209* (2013.01); *G09G 2354/00* (2013.01); *G09G 2360/16* (2013.01)

(58) Field of Classification Search
CPC combination set(s) only.
See application file for complete search history.

(56) References Cited

U.S. PATENT DOCUMENTS 5,920,299 A * 7/1999 Ohshima .............. G09G 3/2074 345/84
6,014,121 A * 1/2000 Aratani ................. G06T 3/4015 345/87
2014/0145586 A1* 5/2014 Choi .................... H10K 59/351 313/504
2021/0090487 A1* 3/2021 Chu .................... H01L 25/0753

* cited by examiner

*Primary Examiner* — William Boddie
*Assistant Examiner* — Alecia D English
(74) *Attorney, Agent, or Firm* — Intellectual Valley Law. P.C.

(57) ABSTRACT

A display method is provided. The display method includes providing a display panel having a plurality of subpixels, a respective subpixel of the plurality of subpixels including a first area, n1 number of second areas, and n2 number of third areas, the first area being between the n1 number of second areas and the n2 number of third areas, n1≥1, and n2≥1; for displaying a first frame of image, controlling light emission of the respective subpixel to be limited in the first area, m1 number of the n1 number of second areas, and m2 number of the n2 number of third areas; and for displaying a second frame of image, controlling light emission of the respective subpixel to be limited in the first area, m1' number of the n1 number of second areas, and m2' number of the n2 number of third areas.

20 Claims, 12 Drawing Sheets

DISPLAY METHOD AND DISPLAY APPARATUS

CROSS-REFERENCE TO RELATED APPLICATION

This application is a national stage application under 35 U.S.C. § 371 of International Application No. PCT/CN2022/072730, filed Jan. 19, 2022, the contents of which are incorporated by reference in the entirety.

TECHNICAL FIELD

The present invention relates to display technology, more particularly, to a display method and a display apparatus.

BACKGROUND

Display devices such as liquid crystal display (LCD) and organic light-emitting diode (OLED) have been widely used. LCD and OLED display devices use thin film transistor (TFT) to control pixels in the display panel. In recent years, miniaturized electro-optics devices are proposed and developed, including micro light emitting diode (micro LED). The micro LED-based display panels have the advantages of high brightness, high contrast ratio, fast response, and low power consumption. The micro LED-based display technology has found a wide range of applications in the display field, including smartphones and smart watches.

SUMMARY

In one aspect, the present disclosure provides a display method, comprising providing a display panel comprising a plurality of subpixels, a respective subpixel of the plurality of subpixels comprising a first area, n1 number of second areas, and n2 number of third areas, the first area being between the n1 number of second areas and the n2 number of third areas, n1≥1, and n2≥1; for displaying a first frame of image, controlling light emission of the respective subpixel to be limited in the first area, m1 number of the n1 number of second areas, and m2 number of the n2 number of third areas, 0≤m1≤n1, and 0≤m2≤n2; and for displaying a second frame of image, controlling light emission of the respective subpixel to be limited in the first area, m1' number of the n1 number of second areas, and m2' number of the n2 number of third areas, 0≤m1'≤n1, and 0≤m2'≤n2, m1≠m1', and m2≠m2'.

Optionally, for displaying the first frame of image in a first mode, the light emission of the respective subpixel is limited in the first area, m1=0, m2=0; and wherein, for displaying the second frame of image in a second mode, the light emission of the respective subpixel is limited in the first area, the n1 number of second areas, and the n2 number of third areas, m1'=n1, m2'=n2.

Optionally, the display method further comprises, for displaying a third frame of image in a third mode, controlling light emission of the respective subpixel to be limited in the first area, m1" number of the n1 number of second areas, and m2" number of the n2 number of third areas, 1<m1"<n1, 1<m2"<n2, m1<m1"<m1', and m2<m2"<m2'.

Optionally, the first frame of image is a frame of image having a relatively higher degree of image definition; and the second frame of image is a frame of image having a relatively lower degree of image definition; and m1<m1', and m2<m2'.

Optionally, the display method further comprises determining, by one or more processors, a degree of image definition of a respective frame of image; determining, by the one or more processors, an adjustment factor at least partially correlated to the degree of image definition of the respective frame of image; and controlling values of m1, m2, m1', and m2' based on the adjustment factor.

Optionally, the display method further comprises performing, by one or more processors, a Fourier transformation on a respective frame of image to obtain a low frequency component and a high frequency component; determining, by the one or more processors, an adjustment factor at least partially correlated to a ratio of the high frequency component to the low frequency component; and controlling values of m1, m2, m1', and m2' based on the adjustment factor.

Optionally, values of m1, m2, m1', and m2' for a frame of image having a relatively higher ratio of the high frequency component to the low frequency component is smaller than values of m1, m2, m1', and m2' for a frame of image having a relatively lower ratio of the high frequency component to the low frequency component.

Optionally, the display method further comprises determining a gaze direction of a user, and determining a local area of the display panel to which the gaze direction intersects, the local area being smaller than an area of the display panel; determining, by one or more processors, a degree of image definition of a portion of a respective frame of image that is configured to be displayed in the local area; determining, by the one or more processors, an adjustment factor at least partially correlated to the degree of image definition of the portion of the respective frame of image; and controlling, for subpixels in the local area, values of m1, m2, m1', and m2' based on the adjustment factor.

Optionally, the display method further comprises determining a gaze direction of a user, and determining a local area of the display panel to which the gaze direction intersects, the local area being smaller than an area of the display panel; performing, by one or more processors, a Fourier transformation on a portion of a respective frame of image that is configured to be displayed in the local area, to obtain a low frequency component and a high frequency component; determining, by the one or more processors, an adjustment factor at least partially correlated to a ratio of the high frequency component to the low frequency component of the portion of the respective frame of image; and controlling, for subpixels in the local area, values of m1, m2, m1', and m2' based on the adjustment factor.

Optionally, the display method further comprises controlling values of m1, m2, m1', and m2' in a plurality of portions of a respective frame of image, respectively by determining, by one or more processors, a respective degree of image definition of a respective portion of the plurality of portions; determining, by the one or more processors, a respective adjustment factor at least partially correlated to the respective degree of image definition of the respective portion; and controlling, for subpixels configured to display the respective portion, values of m1, m2, m1', and m2' based on the respective adjustment factor.

Optionally, the display method further comprises controlling values of m1, m2, m1', and m2' in a plurality of portions of a respective frame of image, respectively by performing, by one or more processors, a Fourier transformation on a respective portion of the plurality of portions, to obtain a respective low frequency component and a respective high frequency component; determining, by the one or more processors, a respective adjustment factor at least partially correlated to a ratio of the respective high frequency component to the respective low frequency component of the respective portion; and controlling, for subpixels configured to display the respective portion, values of m1, m2, m1', and m2' based on the respective adjustment factor.

Optionally, controlling values of m1, m2, m1', and m2' is manually performed through a switch by a user.

In another aspect, the present disclosure provides a display apparatus, comprising a display panel comprising a plurality of subpixels, a respective subpixel of the plurality of subpixels comprising a first area, n1 number of second areas, and n2 number of third areas, the first area being between the n1 number of second areas and the n2 number of third areas, n1≥1, and n2≥1; and one or more processors configured to for displaying a first frame of image, control light emission of the respective subpixel to be limited in the first area, m1 number of the n1 number of second areas, and m2 number of the n2 number of third areas, 0≤m1≤n1, and 0≤m2≤n2; and for displaying a second frame of image, control light emission of the respective subpixel to be limited in the first area, m1' number of the n1 number of second areas, and m2' number of the n2 number of third areas, 0≤m1'≤n1, and 0≤m2'≤n2, m1≠m1', and m2≠m2'.

Optionally, the one or more processors are further configured to determine a degree of image definition of a respective frame of image; determine an adjustment factor at least partially correlated to the degree of image definition of the respective frame of image; and control values of m1, m2, m1', and m2' based on the adjustment factor.

Optionally, the one or more processors are further configured to determine a Fourier transformation on a respective frame of image to obtain a low frequency component and a high frequency component; determine an adjustment factor at least partially correlated to a ratio of the high frequency component to the low frequency component; and control values of m1, m2, m1', and m2' based on the adjustment factor.

Optionally, the respective subpixel comprises a respective pixel driving circuit connected to a first light emitting element configured to emit light in the first area, n1 number of second light emitting elements configured to emit light in the n1 number of second areas, and n2 number of third light emitting elements configured to emit light in the n2 number of third areas; and the respective pixel driving circuit comprises (n1+n2) number of switches respectively configured to individually connect or disconnect a driving current from the n1 number of second light emitting elements and the n2 number of third light emitting elements.

Optionally, the display apparatus further comprises a plurality of light modulating units, a respective light modulating unit of the plurality of light modulating units configured to modulate light emission in the respective subpixel; wherein the respective light modulating unit comprises n1 number of second light modulators configured to individually allow or disallow light emission in the n1 number of second areas, and n2 number of third light modulators configured to individually allow or disallow light emission in the n2 number of third areas.

Optionally, the display apparatus further comprises a camera configured to track a gaze of a user; wherein the one or more processors are further configured to determine a gaze direction of the gaze of the user, and determine a local area of the display panel to which the gaze direction intersects, the local area being smaller than an area of the display panel; determine a degree of image definition of a portion of a respective frame of image that is configured to be displayed in the local area; determine an adjustment factor at least partially correlated to the degree of image definition of the portion of the respective frame of image; and control, for subpixels in the local area, values of m1, m2, m1', and m2' based on the adjustment factor.

Optionally, the display apparatus further comprises a camera configured to track a gaze of a user; wherein the one or more processors are further configured to determine a gaze direction of the gaze of the user, and determining a local area of the display panel to which the gaze direction intersects, the local area being smaller than an area of the display panel; perform a Fourier transformation on a portion of a respective frame of image that is configured to be displayed in the local area, to obtain a low frequency component and a high frequency component; determine an adjustment factor at least partially correlated to a ratio of the high frequency component to the low frequency component of the portion of the respective frame of image; and control, for subpixels in the local area, values of m1, m2, m1', and m2' based on the adjustment factor.

Optionally, the one or more processors are further configured to control values of m1, m2, m1', and m2' in a plurality of portions of a respective frame of image, respectively by determining, by one or more processors, a respective degree of image definition of a respective portion of the plurality of portions; determining, by the one or more processors, a respective adjustment factor at least partially correlated to the respective degree of image definition of the respective portion; and controlling, for subpixels configured to display the respective portion, values of m1, m2, m1', and m2' based on the respective adjustment factor.

Optionally, the one or more processors are further configured to controlling values of m1, m2, m1', and m2' in a plurality of portions of a respective frame of image, respectively by performing, by the one or more processors, a Fourier transformation on a respective portion of the plurality of portions, to obtain a respective low frequency component and a respective high frequency component; determining, by the one or more processors, a respective adjustment factor at least partially correlated to a ratio of the respective high frequency component to the respective low frequency component of the respective portion; and controlling, for subpixels configured to display the respective portion, values of m1, m2, m1', and m2' based on the respective adjustment factor.

Optionally, the display apparatus further comprises a switch configured to control values of m1, m2, m1', and m2'.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display method and a display apparatus that substantially obviate one or more of the problems due to limitations and disadvantages of the related art. In one aspect, the present disclosure provides a display method. In some embodiments, the display method includes providing a display panel comprising a plurality of subpixels, a respective subpixel of the plurality of subpixels comprising a first area, n1 number of second areas, and n2 number of third areas, the first area being between the n1 number of second areas and the n2 number of third areas, $n1 \geq 1$, and $n2 \geq 1$; for displaying a first frame of image, controlling light emission of the respective subpixel to be limited in the first area, m1 number of the n1 number of second areas, and m2 number of the n2 number of third areas, $0 \leq m1 \leq n1$, and $0 \leq m2 \leq n2$; and for displaying a second frame of image, controlling light emission of the respective subpixel to be limited in the first area, m1' number of the n1 number of second areas, and m2' number of the n2 number of third areas, $0 \leq m1' \leq n1$, and $0 \leq m2' \leq n2$, $m1 \neq m1'$, and $m2 \neq m2'$.

Figure 1:
FIG. 1 is a comparison between an image without noticeable moiré pattern (on the left) and an image with moiré pattern (on the right).

Two issues affect image display quality in the existing display panels. The first issue relates to moiré pattern. One possible reason for the occurrence of moiré pattern is due to gap regions between adjacent subpixels, which are typically arranged in a repeating pattern. In display panel having the gap regions between adjacent subpixels, particularly in display panel having micro-lenses on the subpixels, the moiré pattern can be noticeable. FIG. 1 is a comparison between an image without moiré pattern (on the left) and an image with moiré pattern (on the right).

Figure 2:
FIG. 2 is a comparison between an image without noticeable inter-subpixel crosstalk (on the left) and an image with crosstalk (on the right).

The second issue relates to crosstalk between the adjacent subpixels. In one example in a display panel having micro-lenses on subpixels, light emitted from each subpixel is converted by a respective micro-lens into a light beam, when the subpixel is positioned at a focus point of the micro-lens. For example, a first subpixel emits light, the light is converged by a first micro-lens into a first light beam, and a second subpixel emits light, and the light is converged by a second micro-lens into a second light beam. Ideally, the first light beam and the second light beam are both collimated light beams. However, because the subpixel has a certain size, the light beam produced by the micro-lens typically is not perfectly collimated, but unavoidably has a certain divergence angle. Due to the divergence angle, the second light beam that is not designed to be detected in a viewpoint (an eye) would partially enter into the viewpoint, resulting in the crosstalk. FIG. 2 is a comparison between an image without noticeable inter-subpixel crosstalk (on the left) and an image with crosstalk (on the right).

The inventors of the present disclosure discover that sometimes moiré pattern and crosstalk occur for exactly the opposite reasons. For example, crosstalk is prone to occur when adjacent subpixels are too close to each other, whereas moiré pattern is prone to occur when adjacent subpixels are spaced apart too far which leads to a large inter-subpixel gap. The inventors of the present disclosure discover that, surprisingly and unexpectedly, a synergistic effect may be achieved by adopting a novel display panel with a unique structure and a corresponding display method.

Figure 3:
FIG. 3 illustrates effects of moiré pattern and crosstalk on images having different definitions.

FIG. 3 illustrates effects of moiré pattern and crosstalk on images having different definitions. Referring to FIG. 3, the facial image on top-left is an image of a relatively higher definition, with full details; the landscape image on bottom-left is an image of a relatively lower definition, with less details, and rather monotonous. The facial image on top-middle is an image with moiré pattern, and the facial image on top-right is an image with crosstalk. The landscape image on bottom-middle is an image with moiré pattern, and the landscape image on bottom-right is an image with crosstalk. The inventors of the present disclosure discover that, for a relatively high-definition image with more details (e.g., the facial image), moiré pattern has much lower visual impact on user experience than crosstalk defects, whereas, for a relatively low-definition image with less details (e.g., the landscape image), crosstalk has much lower visual impact on user experience than moiré pattern defects.

The inventors of the present disclosure discover that the issues of moiré pattern and crosstalk are particularly problematic in three-dimensional display. In one example, the inventors of the present disclosure discover that these issues become more prominent in glasses-free three-dimensional display apparatuses such as a light field display apparatus. Typically, the glasses-free three-dimensional display apparatuses use either a lenticular lens grating (e.g., a liquid crystal lens grating) or a parallax barrier grating (e.g., a liquid crystal parallax barrier grating) for achieving three-dimensional image display. However, the display method and display apparatus according to the present disclosure are not limited to three-dimensional display, and may be implemented in any appropriate image display methods and image display apparatuses, including a two-dimensional display.

Figure 4:
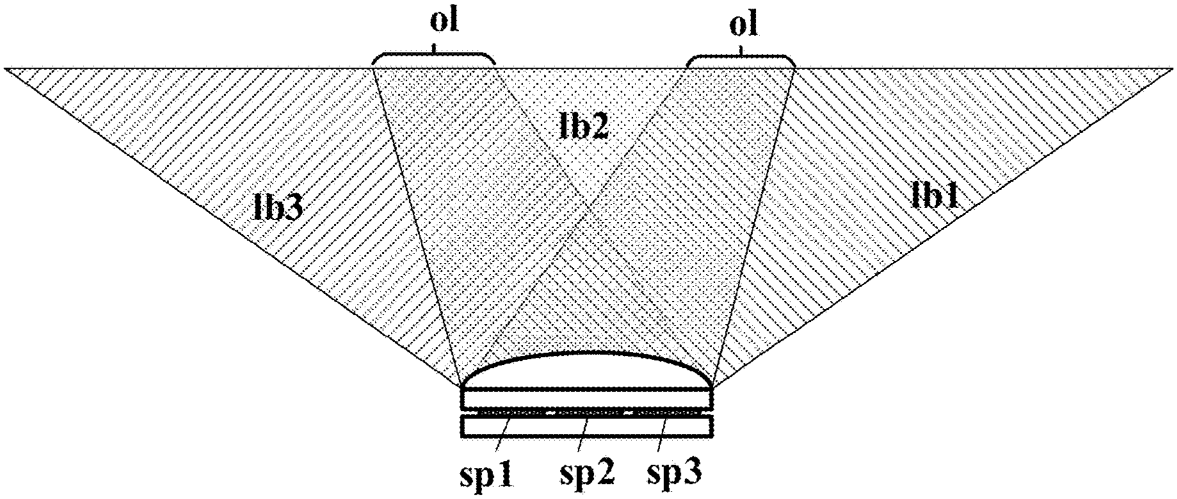
FIG. 4 illustrates occurrence of crosstalk in a display apparatus.

FIG. 4 illustrates occurrence of crosstalk in a display apparatus. Referring to FIG. 4, three subpixels sp1, sp2, and sp3 of the display apparatus are shown. The light beams corresponding to the subpixels sp1, sp2, and sp3 are denoted by lb1, lb2, and lb3. As shown in FIG. 4, the three subpixels sp1, sp2, and sp3 are relatively close to each other. When the inter-subpixel distance is relatively small, adjacent light beams partially overlap with each other, as denoted by overlapping region ol in FIG. 4. For example, the light beam lb1 partially overlaps with the light beam lb2, and the light beam lb3 partially overlaps with the light beam lb2, resulting in crosstalk between subpixels sp1 and sp2, and between subpixels sp2 and sp3.

Figure 5:
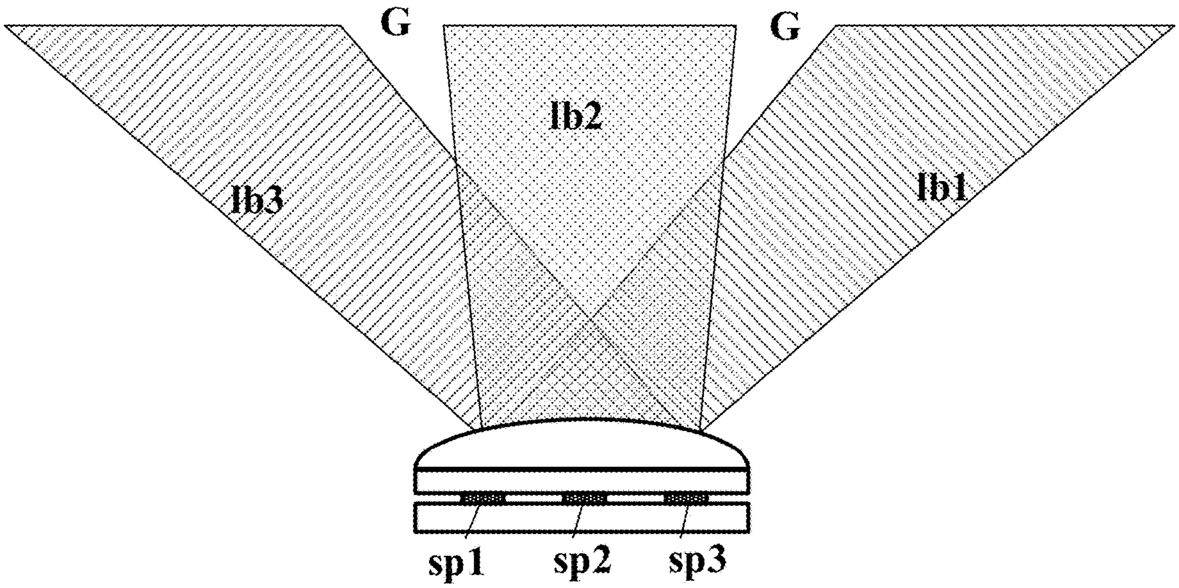
FIG. 5 illustrates occurrence of moiré pattern in a display apparatus.

FIG. 5 illustrates occurrence of moiré pattern in a display apparatus. Referring to FIG. 5, the three subpixels sp1, sp2, and sp3 are relatively spaced apart from each other. As a result, adjacent light beams are spaced apart from each other, forming gaps between adjacent light beams, as denoted by gap regions G in FIG. 5. For example, there is a gap between the first light beam lb1 and the second light beam lb2, and a gap between the third light beam lb3 and the second light beam lb2, resulting in moiré pattern.

Figure 6:
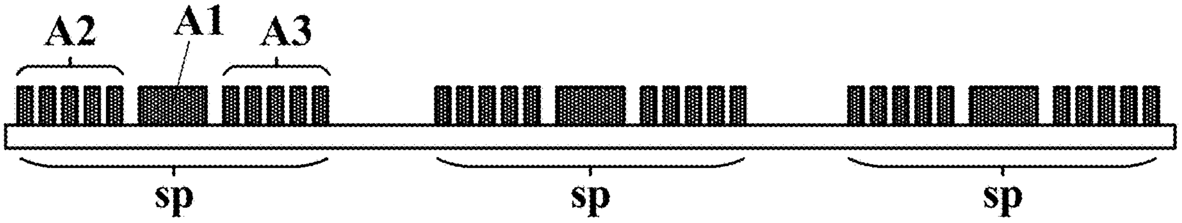
FIG. 6 is a schematic diagram illustrating a plurality of subpixels in a display apparatus in some embodiments according to the present disclosure.
Figure 7:
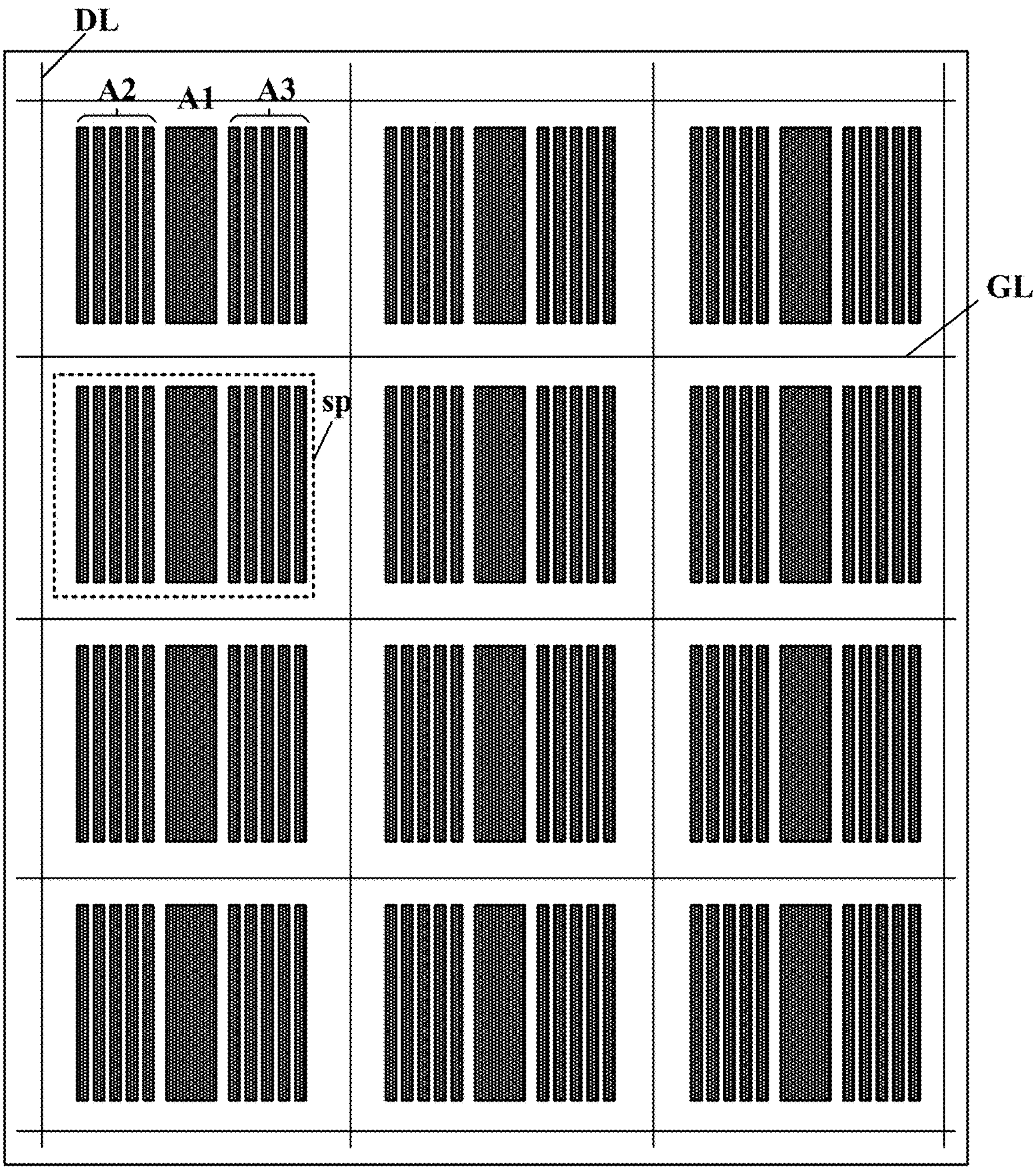
FIG. 7 is a plan view of a plurality of subpixels in a display apparatus in some embodiments according to the present disclosure.

FIG. 6 is a schematic diagram illustrating a plurality of subpixels in a display apparatus in some embodiments according to the present disclosure. FIG. 7 is a plan view of a plurality of subpixels in a display apparatus in some embodiments according to the present disclosure. Referring to FIG. 6 and FIG. 7, the display panel in some embodiments includes a plurality of subpixels sp. Optionally, a respective subpixel of the plurality of subpixels sp includes a first area A1, n1 number of second areas A2, and n2 number of third areas A3. The first area A1 is between the n1 number of second areas A2 and the n2 number of third areas A3. Optionally, $n1 \geq 1$. Optionally, $n2 \geq 1$. Optionally, $n1 = n2$. The display panel further includes a plurality of gate lines GL configured to provide driving signals to the plurality of subpixels sp, and a plurality of data lines DL configured to provide data signals to the plurality of subpixels sp. As used herein, the term subpixel denotes a unit that receives a same data signal. For example, any one of the first area A1, the n1 number of second areas A2, and the n2 number of third areas A3 in a same subpixel are configured to receive a same data signal. For example, when all of the first area A1, the n1 number of second areas A2, and the n2 number of third areas A3 in a same subpixel are configured to emit light, they are driven by a same driving signal with supply of a same data signal. In one example, the display panel further includes additional area(s) configured to emit light between the first area A1 and the n1 number of second areas A2; and/or additional area(s) configured to emit light between the first area A1 and the n2 number of third areas A3; the additional area(s) are in the same subpixel and configured to receive a same data signal as the first area A1, the n1 number of second areas A2, and the n2 number of third areas A3. In another example, the display panel is absent of any additional area(s) configured to emit light between the first area A1 and the n1 number of second areas A2; or absent of any additional area(s) configured to emit light between the first area A1 and the n2 number of third areas A3.

Figure 8:
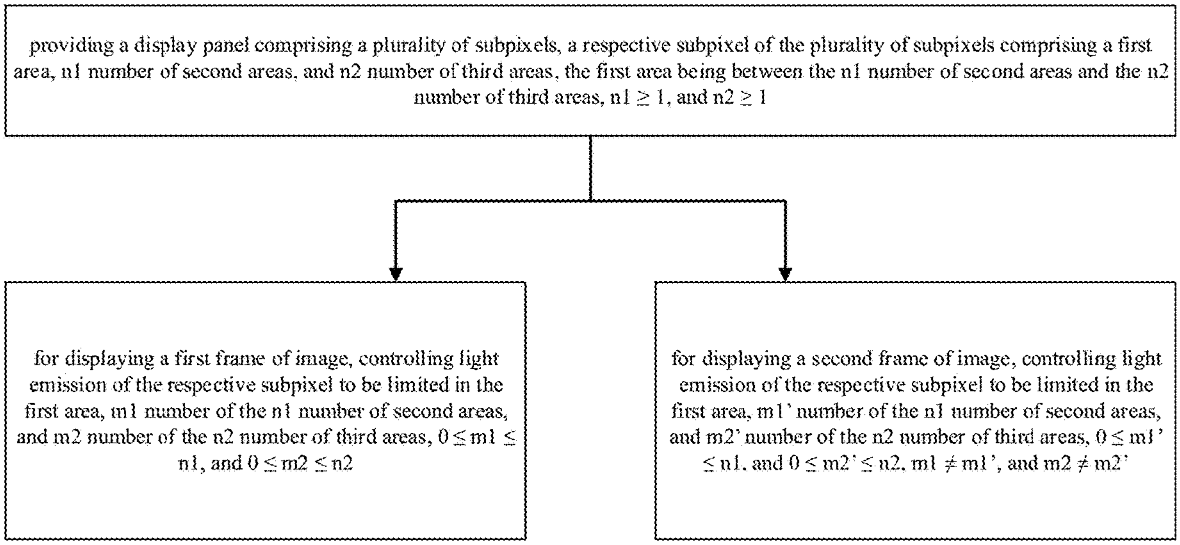
FIG. 8 illustrates a method of display a subpixel image in some embodiments according to the present disclosure.

In the present display method, for displaying at least two different frames of image, the respective subpixel is configured to display two subpixel images, respectively, using different areas. FIG. 8 illustrates a method of display a subpixel image in some embodiments according to the present disclosure. Referring to FIG. 8, the display method in some embodiments includes providing a display panel comprising a plurality of subpixels, a respective subpixel of the plurality of subpixels comprising a first area, n1 number of second areas, and n2 number of third areas, the first area being between the n1 number of second areas and the n2 number of third areas, $n1 \geq 1$, and $n2 \geq 1$; for displaying a first frame of image, controlling light emission of the respective subpixel to be limited in the first area, m1 number of the n1 number of second areas, and m2 number of the n2 number of third areas, $0 \leq m1 \leq n1$, and $0 \leq m2 \leq n2$; and for displaying a second frame of image, controlling light emission of the respective subpixel to be limited in the first area, m1' number of the n1 number of second areas, and m2' number of the n2 number of third areas, $0 \leq m1' \leq n1$, and $0 \leq m2' \leq n2$, $m1 \neq m1'$, and $m2 \neq m2'$.

In one example, $n1 = n2 = 1$; $m1 = m2 = 0$, and $m1' = m2' = 1$.

Figure 9:
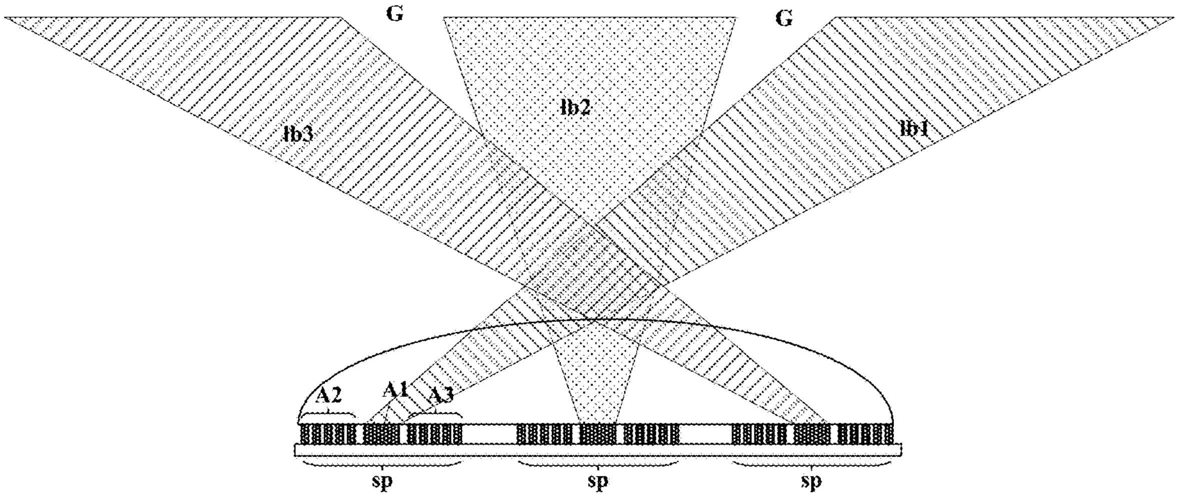
FIG. 9 illustrates displaying a subpixel image in a first mode.

FIG. 9 illustrates displaying a subpixel image in a first mode. In the first mode, only the first area A1 is configured to emit light, whereas the n1 number of second areas A2 and the n2 number of third areas A3 are configured not to emit light. Because the light emission area of the respective subpixel is limited to the first area A1, the light beams are relatively narrow. As shown in FIG. 9, the adjacent light beams are spaced apart from each other, forming gaps between adjacent light beams. For example, there is a gap between the first light beam lb1 and the second light beam lb2, and a gap between the third light beam lb3 and the second light beam lb2, resulting in moiré pattern.

Figure 10:
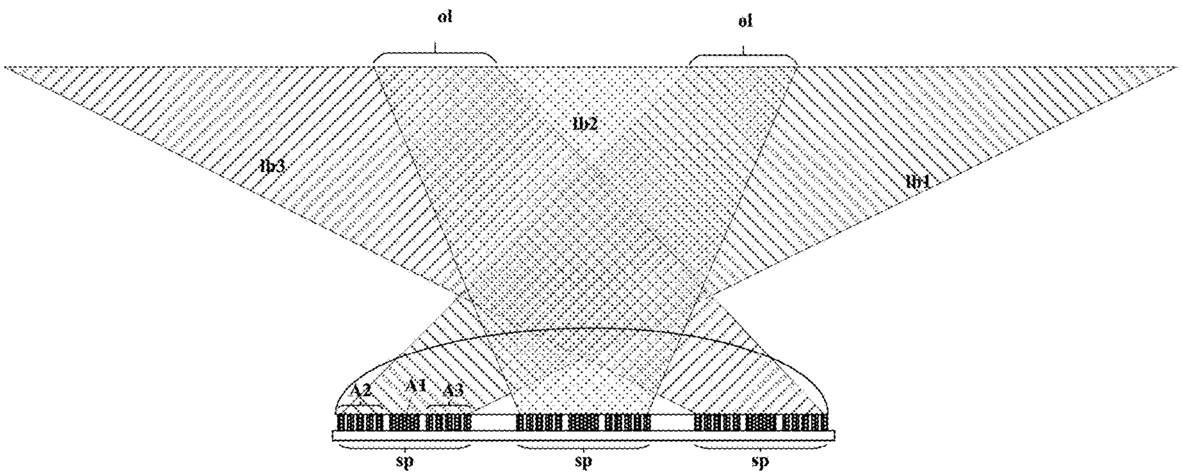
FIG. 10 illustrates displaying a subpixel image in a second mode.

FIG. 10 illustrates displaying a subpixel image in a second mode. In the second mode, all of the first area A1, the n1 number of second areas A2 and the n2 number of third areas A3 are configured not to emit light. Because all of light emission areas of the respective subpixel are used in emitting light, the light beams are relatively more divergent. As shown in FIG. 10, the adjacent light beams partially overlap with each other. For example, the light beam lb1 partially overlaps with the light beam lb2, and the light beam lb3 partially overlaps with the light beam lb2, resulting in crosstalk between subpixels sp1 and sp2, and between subpixels sp2 and sp3.

In some embodiments, the display method includes displaying a first frame of image in the first mode, and displaying a second frame of image in the second mode. The inventors of the present disclosure discover that, as discussed above, for a relatively high-definition image with more details (e.g., the facial image), moiré pattern has much lower visual impact on user experience than crosstalk defects, whereas, for a relatively low-definition image with less details (e.g., the landscape image), crosstalk has much lower visual impact on user experience than moiré pattern defects. Accordingly, in some embodiments, the first frame of image displayed in the first mode is a frame of image of a relatively higher definition and with more details, and the second frame of image display in the second mode is a frame of image of a relatively lower definition and with less details.

The displaying modes are not limited to the first mode and the second mode. In some embodiments, the display method further includes displaying a third frame of image in a third mode. The display method includes controlling light emission of the respective subpixel to be limited in the first area, m1" number of the n1 number of second areas, and m2" number of the n2 number of third areas. Optionally, $1 < m1'' < n1$, and $1 < m2'' < n2$.

A frame of image of a relatively higher definition and with more details may be displayed in the first mode. Alternatively, the frame of image of a relatively higher definition and with more details may be displayed in a third mode. A frame of image of a relatively lower definition and with less details may be displayed in the second mode. Alternatively, the frame of image of a relatively lower definition and with less details may be displayed in a third mode.

Figure 11:
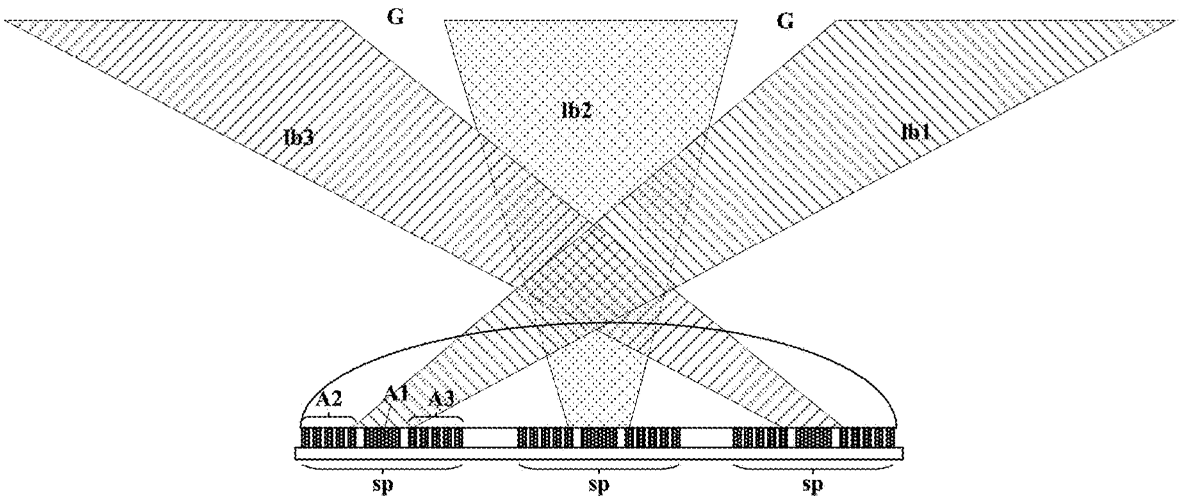
FIG. 11 illustrates displaying a subpixel image in a frame of image having a relatively higher degree of image definition.

In some embodiments, the first frame of image is a frame of image having a relatively higher degree of image definition; and the second frame of image is a frame of image having a relatively lower degree of image definition. Optionally, m1<m1', and m2<m2'. FIG. 11 illustrates displaying a subpixel image in a frame of image having a relatively higher degree of image definition. In FIG. 11, m1=m2=1. In displaying the frame of image having a relatively higher degree of image definition, the first area A1, only one of the n1 number of second areas A2, and only one of the n2 number of third areas A3 are configured to emit light, whereas other (n1−1) number of second areas and other (n2−1) number of third areas are configured not to emit light. Because the light emission area of the respective subpixel is limited to the first area A1, only one of the n1 number of second areas A2, and only one of the n2 number of third areas A3, the light beams are relatively narrow. As shown in FIG. 11, the adjacent light beams are spaced apart from each other, forming gaps between adjacent light beams. For example, there is a gap between the first light beam lb1 and the second light beam lb2, and a gap between the third light beam lb3 and the second light beam 1*b*2, resulting in moiré pattern.

Figure 12:
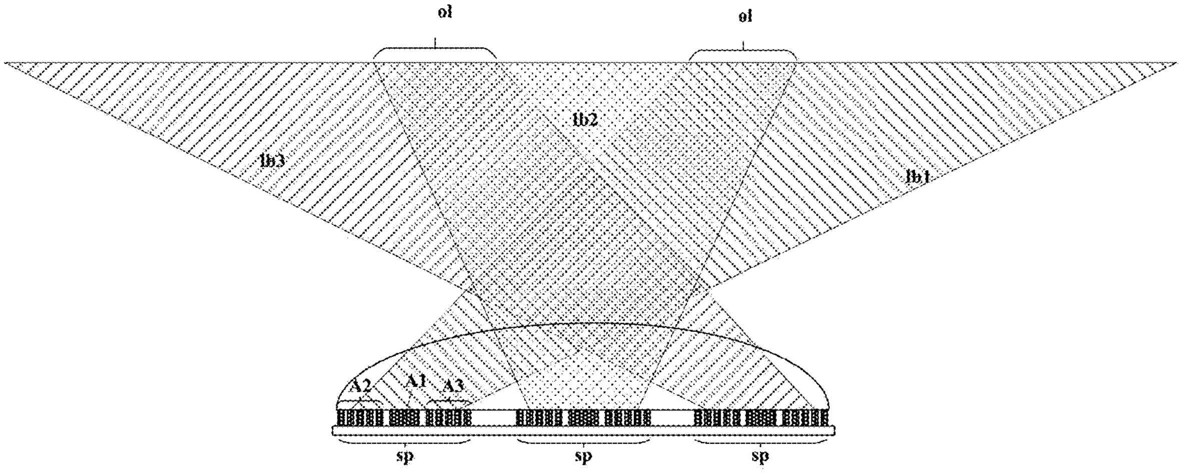
FIG. 12 illustrates displaying a subpixel image in a frame of image having a relatively lower degree of image definition.

FIG. 12 illustrates displaying a subpixel image in a frame of image having a relatively lower degree of image definition. In FIG. 12, m1'=m2'=3. In displaying the frame of image having a relatively lower degree of image definition, the first area A1, (n1−1) number of second areas of the n1 number of second areas A2, and (n2−1) number of third areas of the n2 number of third areas A3 are configured not to emit light. Because most of light emission areas of the respective subpixel are used in emitting light, the light beams are relatively more divergent. As shown in FIG. 12, the adjacent light beams partially overlap with each other. For example, the light beam lb1 partially overlaps with the light beam lb2, and the light beam lb3 partially overlaps with the light beam lb2, resulting in crosstalk between subpixels sp1 and sp2, and between subpixels sp2 and sp3.

In some embodiments, controlling values of m1, m2, m1', and m2' is manually performed through a switch by a user. The user may manually adjust the values of m1, m2, m1', and m2' until the user experience in viewing the images (e.g., a video) is optimized. Moreover, the present display method enables the user to adjust the values of m1, m2, m1', and m2' in real time. In one example, the display method provides (n+1) number of options (e.g., in a numeric order), wherein n=n1=n2.

In some embodiments, controlling values of m1, m2, m1', and m2' is performed, e.g., automatically by a processor. In some embodiments, the display method further includes determining, by one or more processors, a degree of image definition of a respective frame of image; determining, by the one or more processors, an adjustment factor at least partially correlated to the degree of image definition of the respective frame of image; and controlling values of m1, m2, m1', and m2' based on the adjustment factor. In some embodiments, the higher the degree of image definition, the lower are the values of m1, m2, m1', and m2'.

Various appropriate methods may be used to determine the degree of image definition. In some embodiments, determination of the degree of image definition is performed using a Fourier transformation algorithm. In some embodiments, the display method includes performing, by the one or more processors, a Fourier transformation on a respective frame of image to obtain a low frequency component and a high frequency component; determining, by the one or more processors, an adjustment factor at least partially correlated to a ratio of the high frequency component to the low frequency component; and controlling values of m1, m2, m1', and m2' based on the adjustment factor. Specifically, in one example, the Fourier transformation algorithm may be expressed as:

$$F(u, v) = \sum_{x=0}^{M-1} \sum_{y=1}^{N-1} f(x, y) e^{-j2\pi\left(\frac{ux}{M} + \frac{vy}{N}\right)};$$

wherein M and N stand for a number of columns and a number of rows of subpixels, F(u, v) stands for frequency. The frequency of an image represents a degree of change in grayscale throughout the image, the frequency of the image may be considered as a gradient of the grayscale in a two-dimensional space. For example, a monotonous image (an image of a dessert) has a relatively low frequency because the grayscale of the image varies very little in different portions of the image. A high-definition image with full details corresponds to a relatively high frequency obtained by the Fourier transformation. The higher the frequency, the higher definition the image has.

In some embodiments, values of m1, m2, m1', and m2' for a frame of image having a relatively higher ratio of the high frequency component to the low frequency component is smaller than values of m1, m2, m1', and m2' for a frame of image having a relatively lower ratio of the high frequency component to the low frequency component. Optionally, the frame of image may be considered as an image of high definition when the ratio of the high frequency component to the low frequency component is greater than a threshold value, e.g., 1:1.

Figure 13:
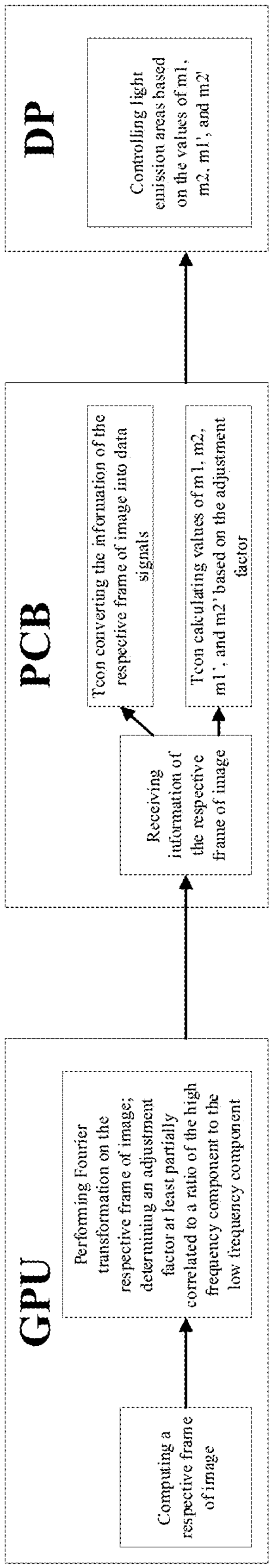
FIG. 13 illustrates a process of automatically controlling values of m1, m2, m1', and m2'.

In some embodiments, the one or more processors includes a graphic processing unit (GPU) and a timing controller. FIG. 13 illustrates a process of automatically controlling values of m1, m2, m1', and m2'. Referring to FIG. 13, in some embodiment, the graphic processing unit GPU is configured to compute a respective frame of image; perform a Fourier transformation on a respective frame of image to obtain a low frequency component and a high frequency component, and determine an adjustment factor at least partially correlated to a ratio of the high frequency component to the low frequency component. A printed circuit board PCB receives information of the respective frame of image. A timing controller Tcon in the printed circuit board PCB is configured to convert the information of the respective frame of image into data signals, and transmit the data signals to a display panel DP. Moreover, the timing controller Tcon is further configured to calculate values of m1, m2, m1', and m2' based on the adjustment factor. The display panel is configured to control light emission areas based on the values of m1, m2, m1', and m2', as discussed above (for example, in FIG. 9 to FIG. 12).

In some embodiments, a frame of image may include portions of different characteristics. For example, the frame of image may include a first portion which is a monotonous background portion, and a second portion which is a high-definition, highly detailed foreground portion. For the first portion, crosstalk has much lower visual impact on user experience than moiré pattern defects. For the second portion, moiré pattern has much lower visual impact on user experience than crosstalk defects. Accordingly, the present method also provides a solution for significantly enhancing user experience in viewing this type of frame of image.

In some embodiments, the present display method includes first determining a gaze direction of a user, and determining a local area of the display panel to which the gaze direction intersects, the local area being smaller than an area of the display panel. When the user is gazing on the first portion, the display method automatically adjust the values of m1, m2, m1', and m2' so that light emission areas of the respective subpixel in the local area are increased. When the user is gazing on the second portion, the display method automatically adjust the values of m1, m2, m1', and m2' so that light emission areas of the respective subpixel in the local area are decreased.

In some embodiments, the present display method further includes determining, by one or more processors, a degree of image definition of a portion of a respective frame of image that is configured to be displayed in the local area; determining, by the one or more processors, an adjustment factor at least partially correlated to the degree of image definition of the portion of the respective frame of image; and controlling, for subpixels in the local area, values of m1, m2, m1', and m2' based on the adjustment factor.

Specifically, in some embodiments, determination of the degree of image definition is performed using a Fourier transformation algorithm, as discussed above. Accordingly, in some embodiments, the present display method includes determining a gaze direction of a user, and determining a local area of the display panel to which the gaze direction intersects, the local area being smaller than an area of the display panel; performing, by the one or more processors, a Fourier transformation on a portion of a respective frame of image that is configured to be displayed in the local area, to obtain a low frequency component and a high frequency component; determining, by the one or more processors, an adjustment factor at least partially correlated to a ratio of the high frequency component to the low frequency component of the portion of the respective frame of image; and controlling, for subpixels in the local area, values of m1, m2, m1', and m2' based on the adjustment factor.

Figure 14:
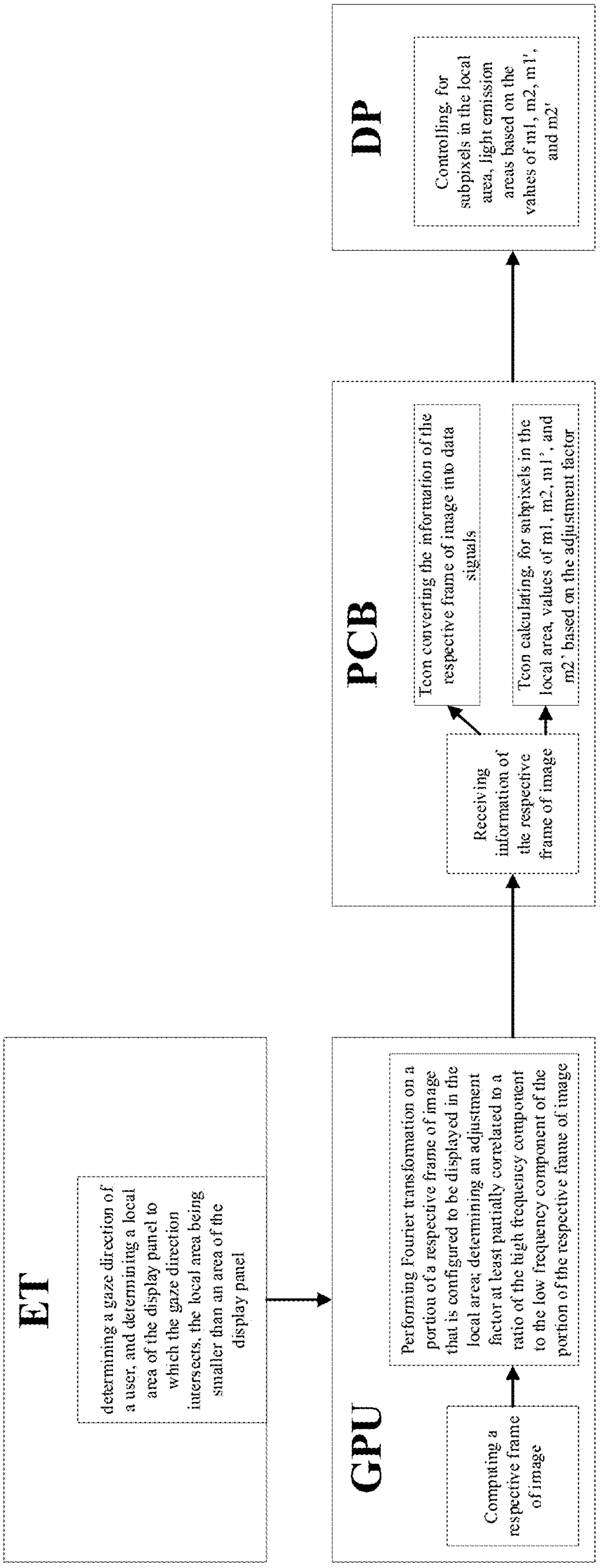
FIG. 14 illustrates a process of automatically controlling values of m1, m2, m1', and m2'.

FIG. 14 illustrates a process of automatically controlling values of m1, m2, m1', and m2'. Referring to FIG. 14, in some embodiment, an eye tracker ET is configured to determining a gaze direction of a user, and determining a local area of the display panel to which the gaze direction intersects, the local area being smaller than an area of the display panel. The graphic processing unit GPU is configured to compute a respective frame of image; perform a Fourier transformation on a portion of a respective frame of image that is configured to be displayed in the local area; and determine an adjustment factor at least partially correlated to a ratio of the high frequency component to the low frequency component of the portion of the respective frame of image. A printed circuit board PCB receives information of the respective frame of image. A timing controller Tcon in the printed circuit board PCB is configured to convert the information of the respective frame of image into data signals, and transmit the data signals to a display panel DP. Moreover, the timing controller Tcon is further configured to calculate, for subpixels in the local area, values of m1, m2, m1', and m2' based on the adjustment factor. The display panel is configured to control, for subpixels in the local area, light emission areas based on the values of m1, m2, m1', and m2'.

In some embodiments, the respective frame of image includes a plurality of portions, for example, the first portion and the second portion having different definition, as discussed above. In some embodiments, the display method includes controlling values of m1, m2, m1', and m2' in a plurality of portions of a respective frame of image, respectively. In some embodiments, controlling values of m1, m2, m1', and m2' in a plurality of portions of a respective frame of image, respectively, includes determining, by one or more processors, a respective degree of image definition of a respective portion of the plurality of portions; determining, by the one or more processors, a respective adjustment factor at least partially correlated to the respective degree of image definition of the respective portion; and controlling, for subpixels configured to display the respective portion, values of m1, m2, m1', and m2' based on the respective adjustment factor.

Specifically, in some embodiments, determination of the degree of image definition is performed using a Fourier transformation algorithm, as discussed above. Accordingly, in some embodiments, the present display method includes performing, by the one or more processors, a Fourier transformation on a respective portion of the plurality of portions, to obtain a respective low frequency component and a respective high frequency component; determining, by the one or more processors, a respective adjustment factor at least partially correlated to a ratio of the respective high frequency component to the respective low frequency component of the respective portion; and controlling, for subpixels configured to display the respective portion, values of m1, m2, m1', and m2' based on the respective adjustment factor.

Figure 15:
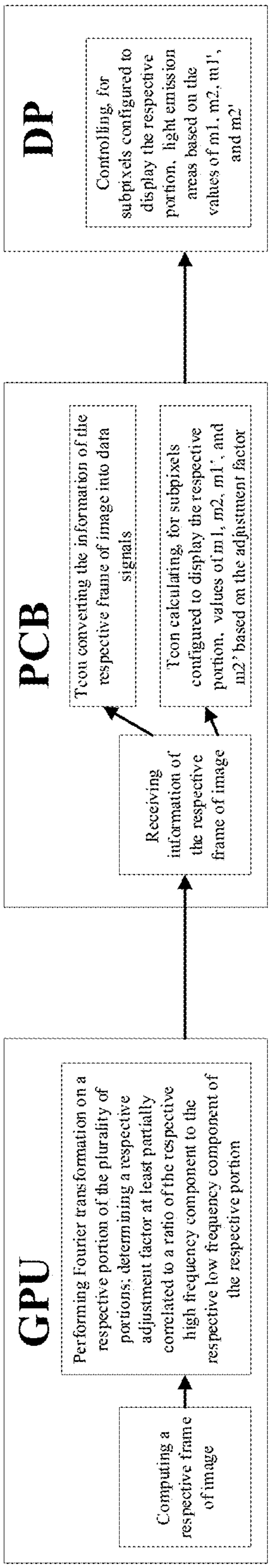
FIG. 15 illustrates a process of automatically controlling values of m1, m2, m1', and m2'.

FIG. 15 illustrates a process of automatically controlling values of m1, m2, m1', and m2'. Referring to FIG. 15, in some embodiment, the graphic processing unit GPU is configured to compute a respective frame of image; perform a Fourier transformation on a respective portion of the plurality of portions, to obtain a low frequency component and a high frequency component, and determine a respective adjustment factor at least partially correlated to a ratio of the respective high frequency component to the respective low frequency component of the respective portion. A printed circuit board PCB receives information of the respective frame of image. A timing controller Tcon in the printed circuit board PCB is configured to convert the information of the respective frame of image into data signals, and transmit the data signals to a display panel DP. Moreover, the timing controller Tcon is further configured to calculate, for subpixels configured to display the respective portion, values of m1, m2, m1', and m2' based on the adjustment factor. The display panel is configured to control, for subpixels configured to display the respective portion, light emission areas based on the values of m1, m2, m1', and m2'.

In another aspect, the present disclosure provides a display apparatus. In some embodiments, the display apparatus includes a display panel comprising a plurality of subpixels, a respective subpixel of the plurality of subpixels comprising a first area, n1 number of second areas, and n2 number of third areas, the first area being between the n1 number of second areas and the n2 number of third areas, $n1 \geq 1$, and $n2 \geq 1$; and one or more processors. Optionally, the one or more processors include a graphic processor unit and a timing controller, as shown in FIG. 13 to FIG. 15.

In some embodiments, the one or more processors are configured to, for displaying a first frame of image, control light emission of the respective subpixel to be limited in the first area, m1 number of the n1 number of second areas, and m2 number of the n2 number of third areas, $0 \leq m1 \leq n1$, and $0 \leq m2 \leq n2$; and for displaying a second frame of image, control light emission of the respective subpixel to be limited in the first area, m1' number of the n1 number of second areas, and m2' number of the n2 number of third areas, $0 \leq m1' \leq n1$, and $0 \leq m2' \leq n2$, $m1 \neq m1'$, and $m2 \neq m2'$.

Optionally, for displaying the first frame of image in a first mode, the light emission of the respective subpixel is limited in the first area, m1=0, m2=0. Optionally, for displaying the second frame of image in a second mode, the light emission of the respective subpixel is limited in the first area, the n1 number of second areas, and the n2 number of third areas, m1'=n1, m2'=n2.

In some embodiments, the one or more processors are configured to, for displaying a third frame of image in a third mode, the light emission of the respective subpixel is limited in the first area, m1" number of the n1 number of second areas, and m2" number of the n2 number of third areas. Optionally, 1<m1"<n1, 1<m2"<n2, m1<m1"<m1', and m2<m2"<m2'.

In some embodiments, the first frame of image is a frame of image having a relatively higher degree of image definition; the second frame of image is a frame of image having a relatively lower degree of image definition; and m1<m1', and m2<m2'.

In some embodiments, the one or more processors are configured to determine a degree of image definition of a respective frame of image; determine an adjustment factor at least partially correlated to the degree of image definition of the respective frame of image; and control values of m1, m2, m1', and m2' based on the adjustment factor In some embodiments, the one or more processors are configured to perform a Fourier transformation on a respective frame of image to obtain a low frequency component and a high frequency component; determine an adjustment factor at least partially correlated to a ratio of the high frequency component to the low frequency component; and control values of m1, m2, m1', and m2' based on the adjustment factor. Optionally, values of m1, m2, m1', and m2' for a frame of image having a relatively higher ratio of the high frequency component to the low frequency component is smaller than values of m1, m2, m1', and m2' for a frame of image having a relatively lower ratio of the high frequency component to the low frequency component.

In some embodiments, the one or more processors are configured to determine a gaze direction of a user, and determine a local area of the display panel to which the gaze direction intersects, the local area being smaller than an area of the display panel; determine a degree of image definition of a portion of a respective frame of image that is configured to be displayed in the local area; determine an adjustment factor at least partially correlated to the degree of image definition of the portion of the respective frame of image; and control, for subpixels in the local area, values of m1, m2, m1', and m2' based on the adjustment factor.

In some embodiments, the one or more processors are configured to determine a gaze direction of a user, and determine a local area of the display panel to which the gaze direction intersects, the local area being smaller than an area of the display panel; perform a Fourier transformation on a portion of a respective frame of image that is configured to be displayed in the local area, to obtain a low frequency component and a high frequency component; determine an adjustment factor at least partially correlated to a ratio of the high frequency component to the low frequency component of the portion of the respective frame of image; and control, for subpixels in the local area, values of m1, m2, m1', and m2' based on the adjustment factor.

In some embodiments, the one or more processors are configured to control values of m1, m2, m1', and m2' in a plurality of portions of a respective frame of image, respectively. In some embodiments, the one or more processors are configured to determine a respective degree of image definition of a respective portion of the plurality of portions; determine a respective adjustment factor at least partially correlated to the respective degree of image definition of the respective portion; and control, for subpixels configured to display the respective portion, values of m1, m2, m1', and m2' based on the respective adjustment factor.

In some embodiments, the one or more processors are configured to control values of m1, m2, m1', and m2' in a plurality of portions of a respective frame of image, respectively. In some embodiments, the one or more processors are configured to perform a Fourier transformation on a respective portion of the plurality of portions, to obtain a respective low frequency component and a respective high frequency component; determine a respective adjustment factor at least partially correlated to a ratio of the respective high frequency component to the respective low frequency component of the respective portion; and control, for subpixels configured to display the respective portion, values of m1, m2, m1', and m2' based on the respective adjustment factor.

In some embodiments, the display apparatus further includes a switch (virtual switch or physical switch) that allows a user to control values of m1, m2, m1', and m2' is manually.

In some embodiments, the display apparatus further includes a camera configured to track a gaze of a user.

In some embodiments, the respective subpixel includes a respective pixel driving circuit, and a plurality of light emitting elements connected in parallel. Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T1C driving circuit. Various appropriate light emitting elements may be used in the present array substrate. Examples of appropriate light emitting elements include organic light emitting diodes, quantum dots light emitting diodes, mini light emitting diodes, and micro light emitting diodes. Optionally, the light emitting element is mini light emitting diode. Optionally, the light emitting element is micro light emitting diode. Optionally, the light emitting element is an organic light emitting diode including an organic light emitting layer.

Figure 16:
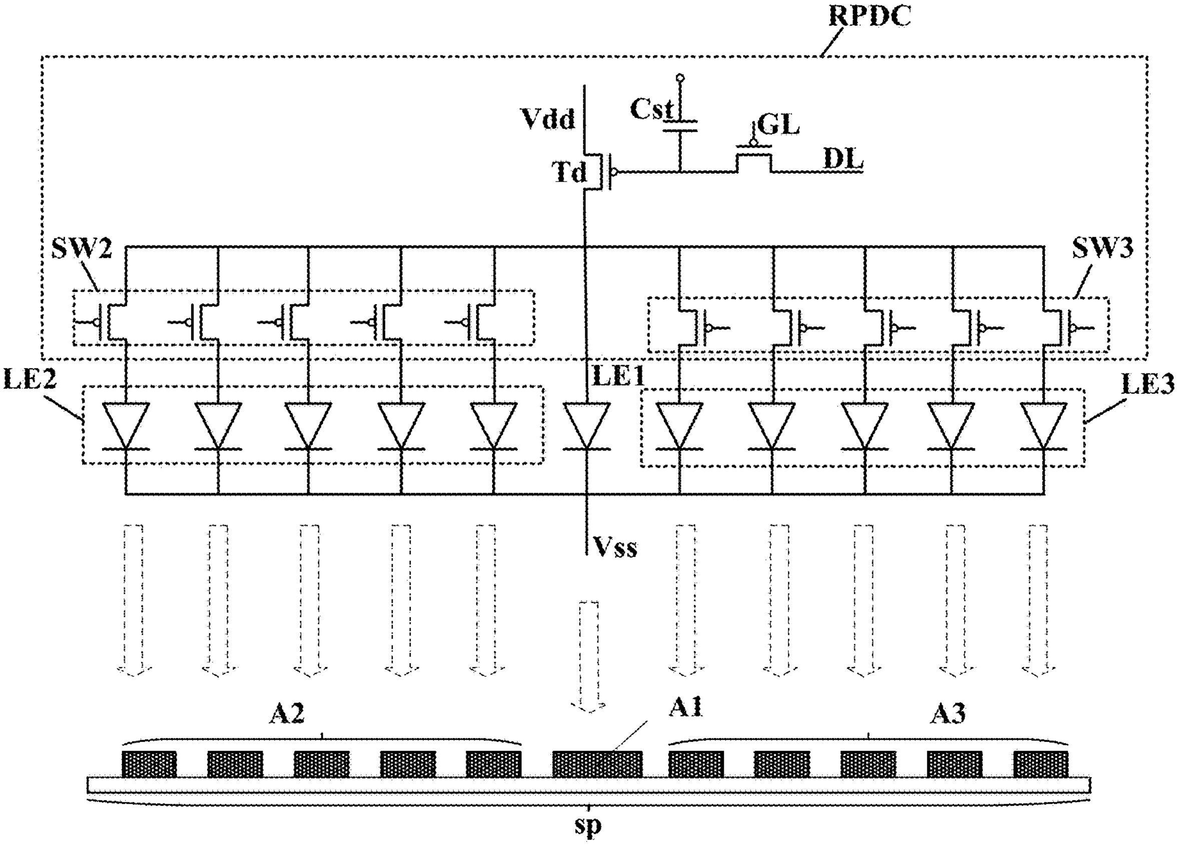
FIG. 16 is a schematic diagram illustrating the structure of a respective pixel driving circuit in some embodiments according to the present disclosure.

FIG. 16 is a schematic diagram illustrating the structure of a respective pixel driving circuit in some embodiments according to the present disclosure. Referring to FIG. 16, the respective subpixel includes a respective pixel driving circuit RPDC. FIG. 16 shows an exemplary 2T1C driving circuit with an addition of a plurality of switches. The respective pixel driving circuit RPDC is connected to a plurality of light emitting elements connected in parallel. The respective pixel driving circuit RPDC is connected to a first light emitting element configured to emit light in the first area A1, connected to n1 number of second light emitting elements LE2 configured to emit light in the n1 number of second areas A2, and n2 number of third light emitting elements LE3 configured to emit light in the n2 number of third areas A3. The respective pixel driving circuit RPDC includes a total of (n1+n2) number of switches respectively configured to individually connect or disconnect a driving current from the n1 number of second light emitting elements LE2 and the n2 number of third light emitting elements LE3. Specifically, the respective pixel driving circuit RPDC includes n1 number of second switches SW2 respectively configured to individually connect or disconnect a driving current (e.g., flowing from a drain electrode of a driving transistor Td) from the n1 number of second light emitting elements LE2, and n2 number of third switches SW3 respectively configured to individually connect or disconnect the driving current from the n2 number of third light emitting elements LE3.

In some embodiments, the one or more processors is configured to, for displaying a first frame of image, control m1 number of the n1 number of second switches SW2 in a connecting state and control m2 number of the n2 number of third switches SW3 in the connecting state, thereby control light emission of the respective subpixel to be limited in the first area A1, m1 number of the n1 number of second areas A2, and m2 number of the n2 number of third areas A3, $0 \le m1 \le n1$, and $0 \le m2 \le n2$. Optionally, for displaying the first frame of image, the one or more processors is configured to control (n1−m1) number of the n1 number of second switches SW2 in a disconnecting state and control (n2−m2) number of the n2 number of third switches SW3 in the disconnecting state. Optionally, the m1 number of the n1 number of second areas A2 are m1 number of second areas closest to the first area A1 (with respect to the (n1−m1) number of the n1 number of second areas A2), and the m2 number of the n2 number of third areas are m2 number of third areas closest to the first area A1 (with respect to the (n2−m2) number of the n2 number of third areas A3). Optionally, the (n1−m1) number of the n1 number of second areas A2 are m1 number of second areas furthest away from the first area A1 (with respect to the m1 number of the n1 number of second areas A2), and the (n2−m2) number of the n2 number of third areas are m2 number of third areas furthest away from the first area A1 (with respect to the m2 number of the n2 number of third areas A3).

In displaying the first frame of image, the first light emitting element LE1, m1 number of the n1 number of second light emitting elements LE2, and m2 number of the n2 number of third light emitting elements LE3, are configured to emit light; whereas (n1−m1) number of the n1 number of second light emitting elements LE2 and (n2−m2) number of the n2 number of third light emitting elements LE3 are configured not to emit light.

In some embodiments, the one or more processors is configured to, for displaying a second frame of image, control m1' number of the n1 number of second switches SW2 in a connecting state and control m2' number of the n2 number of third switches SW3 in the connecting state, thereby control light emission of the respective subpixel to be limited in the first area A1, m1' number of the n1 number of second areas A2, and m2' number of the n2 number of third areas A3, $0 \le m1' \le n1$, and $0 \le m2' \le n2$, $m1 \ne m1'$, and $m2 \ne m2'$. Optionally, for displaying the second frame of image, the one or more processors is configured to control (n1−m1') number of the n1 number of second switches SW2 in a disconnecting state and control (n2−m2') number of the n2 number of third switches SW3 in the disconnecting state. Optionally, the m1' number of the n1 number of second areas A2 are m1' number of second areas closest to the first area A1 (with respect to the (n1−m1') number of the n1 number of second areas A2), and the m2' number of the n2 number of third areas are m2' number of third areas closest to the first area A1 (with respect to the (n2−m2') number of the n2 number of third areas A3). Optionally, the (n1−m1') number of the n1 number of second areas A2 are m1' number of second areas furthest away from the first area A1 (with respect to the m1' number of the n1 number of second areas A2), and the (n2−m2') number of the n2 number of third areas A3 are m2' number of third areas furthest away from the first area A1 (with respect to the m2' number of the n2 number of third areas A3).

In displaying the second frame of image, the first light emitting element LE1, m1' number of the n1 number of second light emitting elements LE2, and m2' number of the n2 number of third light emitting elements LE3, are configured to emit light; whereas (n1−m1') number of the n1 number of second light emitting elements LE2 and (n2−m2') number of the n2 number of third light emitting elements LE3 are configured not to emit light.

FIG. 16 shows the correspondence relationship between light emitting elements and light emission areas. The first light emitting element LE1 corresponds to the first area A1. The n1 number of second light emitting elements LE2 correspond to the n1 number of second areas A2. The n2 number of third light emitting elements LE3 correspond to the n2 number of third areas A3.

Figure 17:
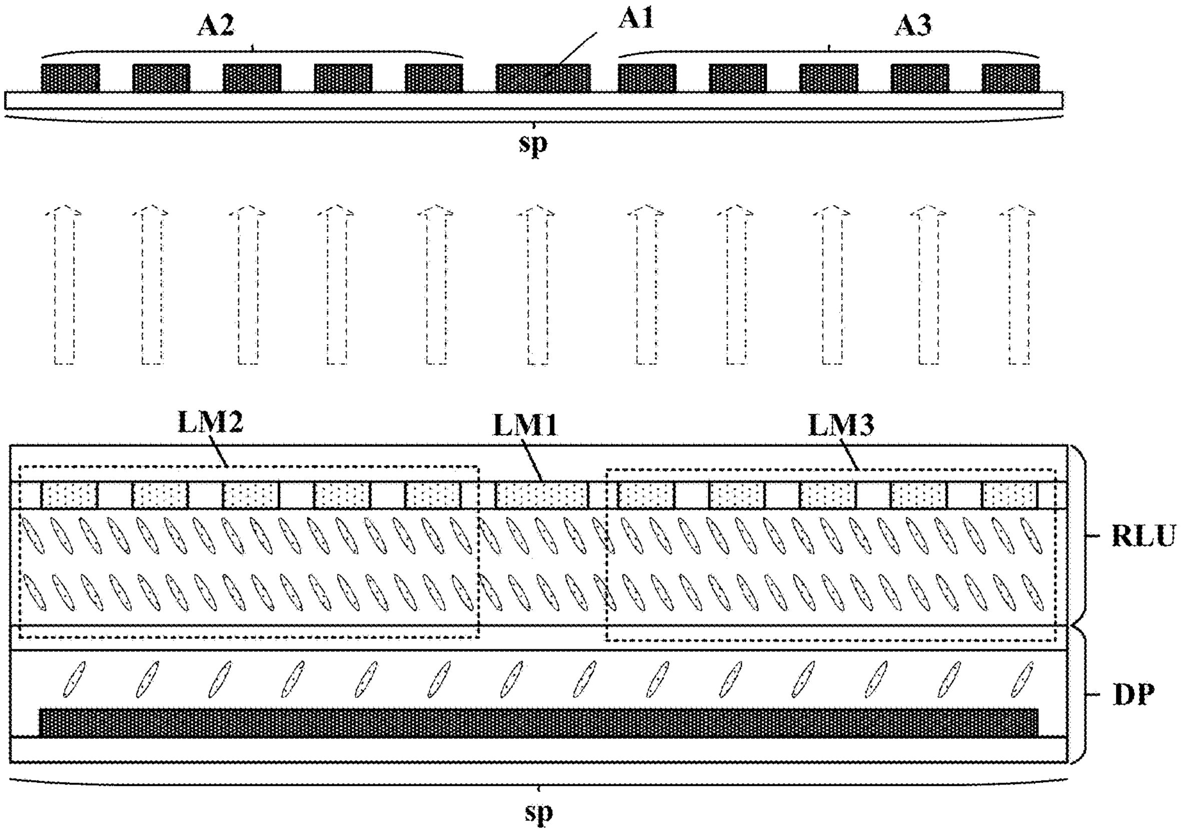
FIG. 17 is a schematic diagram illustrating the structure of a plurality of light modulating units in some embodiments according to the present disclosure.

In some embodiments, the display apparatus includes a plurality of light modulating units, a respective light modulating unit of the plurality of light modulating units configured to modulate light emission in the respective subpixel. In one specific example, the display panel is a liquid crystal display panel, and a light modulator comprising the plurality of light modulating units is a liquid crystal light modulator. The liquid crystal light modulator can modulate light transmission through a liquid crystal material in the liquid crystal light modulator by applying a voltage on the liquid crystal material. FIG. 17 is a schematic diagram illustrating the structure of a plurality of light modulating units in some embodiments according to the present disclosure. Referring to FIG. 17, the display apparatus in some embodiments includes a display panel DP, a respective light modulating unit RLU of a plurality of light modulating units. The plurality of light modulating units correspond to a plurality of subpixels, respectively. FIG. 17 shows a single subpixel (denoted by sp), and a single light modulating unit (denoted by RLU).

In some embodiments, the respective light modulating unit RLU includes n1 number of second light modulators LM2 configured to individually allow or disallow light emission in the n1 number of second areas A2, and n2 number of third light modulators LM3 configured to individually allow or disallow light emission in the n2 number of third areas A3.

In some embodiments, the one or more processors is configured to, for displaying a first frame of image, control m1 number of the n1 number of second light modulators LM2 in a light transmissive state and control m2 number of the n2 number of third light modulators LM3 in the light transmissive state, thereby control light emission of the respective subpixel to be limited in the first area A1, m1 number of the n1 number of second areas A2, and m2 number of the n2 number of third areas A3, $0 \le m1 \le n1$, and $0 \le m2 \le n2$. Optionally, for displaying the first frame of image, the one or more processors is configured to control (n1−m1) number of the n1 number of second light modulators LM2 in a light blocking state and control (n2−m2) number of the n2 number of third light modulators LM3 in the light blocking state. Optionally, the m1 number of the n1 number of second areas A2 are m1 number of second areas closest to the first area A1 (with respect to the (n1−m1) number of the n1 number of second areas A2), and the m2 number of the n2 number of third areas are m2 number of third areas closest to the first area A1 (with respect to the (n2−m2) number of the n2 number of third areas A3). Optionally, the (n1−m1) number of the n1 number of second areas A2 are m1 number of second areas furthest away from the first area A1 (with respect to the m1 number of the n1 number of second areas A2), and the (n2−m2) number of the n2 number of third areas are m2 number of third areas furthest away from the first area A1 (with respect to the m2 number of the n2 number of third areas A3).

In displaying the first frame of image, the respective subpixel in the display panel DP is configured to emit light, light emitted from the respective subpixel and in the first area A1 is not blocked and transmits through the respective light modulating unit RLU. Light emitted from the respective subpixel and in the m1 number of the n1 number of second areas A2 and the m2 number of the n2 number of third areas A3 are not blocked and transmit through the respective light modulating unit RLU. Light emitted from the respective subpixel and in the (n1−m1) number of the n1 number of second areas A2 and the (n2−m2) number of the n2 number of third areas A3 are blocked.

In some embodiments, the one or more processors is configured to, for displaying a second frame of image, control m1' number of the n1 number of second light modulators LM2 in a light transmissive state and control m2' number of the n2 number of third light modulators LM3 in the light transmissive state, thereby control light emission of the respective subpixel to be limited in the first area A1, m1' number of the n1 number of second areas A2, and m2' number of the n2 number of third areas A3, $0 \leq m1' \leq n1$, and $0 \leq m2' \leq n2$, $m1 \neq m1'$, and $m2 \neq m2'$. Optionally, for displaying the second frame of image, the one or more processors is configured to control (n1−m1') number of the n1 number of second light modulators LM2 in a light blocking state and control (n2−m2') number of the n2 number of third light modulators LM3 in the light blocking state. Optionally, the m1' number of the n1 number of second areas A2 are m1' number of second areas closest to the first area A1 (with respect to the (n1−m1') number of the n1 number of second areas A2), and the m2' number of the n2 number of third areas are m2' number of third areas closest to the first area A1 (with respect to the (n2−m2') number of the n2 number of third areas A3). Optionally, the (n1−m1') number of the n1 number of second areas A2 are m1' number of second areas furthest away from the first area A1 (with respect to the m1' number of the n1 number of second areas A2), and the (n2−m2') number of the n2 number of third areas A3 are m2' number of third areas furthest away from the first area A1 (with respect to the m2' number of the n2 number of third areas A3).

In displaying the second frame of image, the respective subpixel in the display panel DP is configured to emit light, light emitted from the respective subpixel and in the first area A1 is not blocked and transmits through the respective light modulating unit RLU. Light emitted from the respective subpixel and in the m1' number of the n1 number of second areas A2 and the m2' number of the n2 number of third areas A3 are not blocked and transmit through the respective light modulating unit RLU. Light emitted from the respective subpixel and in the (n1−m1') number of the n1 number of second areas A2 and the (n2−m2') number of the n2 number of third areas A3 are blocked.

FIG. 17 shows the correspondence relationship between light modulating units and light emission areas. The n1 number of second light modulating units LM2 correspond to the n1 number of second areas A2. The n2 number of third light modulating units LM3 correspond to the n2 number of third areas A3. Although FIG. 17 shows a first light modulating unit LM1 corresponding to the first area A1, the first light modulating unit LM1 is optional. In an alternative example, the first area A1 is absent of any light modulating unit.

FIG. 17 depicts a specific example having a combination of a liquid crystal display panel and a liquid crystal light modulator. Various appropriate light modulators may be used in the present disclosure, examples of which include micro-lens array. Various appropriate display panels may be used in combination with the light modulator. Examples of appropriate display panels include an organic light emitting diode display panel, a quantum dots light emitting diode display panel, a mini light emitting diode display panel, and a micro light emitting diode display panel.

The inventors of the present disclosure discover that the issues of moiré pattern and crosstalk are particularly problematic in three-dimensional display such as glasses-free three-dimensional display apparatuses. In some embodiments, the display panel according to the present disclosure further includes a grating layer for achieving three-dimensional image display. Examples of grating layers include a lenticular lens grating (e.g., a liquid crystal lens grating) or a parallax barrier grating (e.g., a liquid crystal parallax barrier grating).

The inventors of the present disclosure discover that micro LED display panels are particularly suitable for achieving three-dimensional image display with significantly reduced moiré pattern and crosstalk. However, as discussed above, the display method according to the present disclosure may be implemented in any appropriate display panels.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display method, comprising:

providing a display panel comprising a plurality of subpixels, a respective subpixel of the plurality of subpixels comprising a first area, $n1$ number of second areas, and $n2$ number of third areas, the first area being between the $n1$ number of second areas and the $n2$ number of third areas, $n1 \geq 1$, and $n2 \geq 1$;

for displaying a first frame of image, controlling light emission of the respective subpixel to be limited in the first area, $m1$ number of the $n1$ number of second areas, and $m2$ number of the $n2$ number of third areas, $0 \leq m1 \leq n1$, and $0 \leq m2 \leq n2$; and for displaying a second frame of image, controlling light emission of the respective subpixel to be limited in the first area, $m1'$ number of the $n1$ number of second areas, and $m2'$ number of the $n2$ number of third areas, $0 \leq m1' \leq n1$, and $0 \leq m2' \leq n2$, $m1 \neq m1'$, and $m2 \neq m2'$.

2. The display method of claim 1, wherein, for displaying the first frame of image in a first mode, the light emission of the respective subpixel is limited in the first area, $m1=0$, $m2=0$; and wherein, for displaying the second frame of image in a second mode, the light emission of the respective subpixel is limited in the first area, the $n1$ number of second areas, and the $n2$ number of third areas, $m1'=n1$, $m2'=n2$.

3. The display method of claim 1, further comprising, for displaying a third frame of image in a third mode, controlling light emission of the respective subpixel to be limited in the first area, $m1''$ number of the $n1$ number of second areas, and $m2''$ number of the $n2$ number of third areas, $1<m1''<n1$, $1<m2''<n2$, $m1<m1''<m1'$, and $m2<m2''<m2'$.

4. The display method of claim 1, wherein the first frame of image is a frame of image having a relatively higher degree of image definition; and the second frame of image is a frame of image having a relatively lower degree of image definition; and $m1<m1'$, and $m2<m2'$.

5. The display method of claim 1, further comprising:

determining, by one or more processors, a degree of image definition of a respective frame of image;

determining, by the one or more processors, an adjustment factor at least partially correlated to the degree of image definition of the respective frame of image; and controlling values of $m1$, $m2$, $m1'$, and $m2'$ based on the adjustment factor.

6. The display method of claim 1, further comprising:

performing, by one or more processors, a Fourier transformation on a respective frame of image to obtain a low frequency component and a high frequency component;

determining, by the one or more processors, an adjustment factor at least partially correlated to a ratio of the high frequency component to the low frequency component; and controlling values of $m1$, $m2$, $m1'$, and $m2'$ based on the adjustment factor.

7. The display method of claim 6, wherein values of $m1$, $m2$, $m1'$, and $m2'$ for a frame of image having a relatively higher ratio of the high frequency component to the low frequency component is smaller than values of $m1$, $m2$, $m1'$, and $m2'$ for a frame of image having a relatively lower ratio of the high frequency component to the low frequency component.

8. The display method of claim 1, further comprising:

determining a gaze direction of a user, and determining a local area of the display panel to which the gaze direction intersects, the local area being smaller than an area of the display panel;

determining, by one or more processors, a degree of image definition of a portion of a respective frame of image that is configured to be displayed in the local area;

determining, by the one or more processors, an adjustment factor at least partially correlated to the degree of image definition of the portion of the respective frame of image; and controlling, for subpixels in the local area, values of $m1$, $m2$, $m1'$, and $m2'$ based on the adjustment factor.

9. The display method of claim 1, further comprising:

determining a gaze direction of a user, and determining a local area of the display panel to which the gaze direction intersects, the local area being smaller than an area of the display panel;

performing, by one or more processors, a Fourier transformation on a portion of a respective frame of image that is configured to be displayed in the local area, to obtain a low frequency component and a high frequency component;

determining, by the one or more processors, an adjustment factor at least partially correlated to a ratio of the high frequency component to the low frequency component of the portion of the respective frame of image; and controlling, for subpixels in the local area, values of $m1$, $m2$, $m1'$, and $m2'$ based on the adjustment factor.

10. The display method of claim 1, further comprising controlling values of $m1$, $m2$, $m1'$, and $m2'$ in a plurality of portions of a respective frame of image, respectively by:

determining, by one or more processors, a respective degree of image definition of a respective portion of the plurality of portions;

determining, by the one or more processors, a respective adjustment factor at least partially correlated to the respective degree of image definition of the respective portion; and controlling, for subpixels configured to display the respective portion, values of $m1$, $m2$, $m1'$, and $m2'$ based on the respective adjustment factor.

11. The display method of claim 1, further comprising controlling values of $m1$, $m2$, $m1'$, and $m2'$ in a plurality of portions of a respective frame of image, respectively by:

performing, by one or more processors, a Fourier transformation on a respective portion of the plurality of portions, to obtain a respective low frequency component and a respective high frequency component;

determining, by the one or more processors, a respective adjustment factor at least partially correlated to a ratio of the respective high frequency component to the respective low frequency component of the respective portion; and controlling, for subpixels configured to display the respective portion, values of $m1$, $m2$, $m1'$, and $m2'$ based on the respective adjustment factor.

12. A display apparatus, comprising:

a display panel comprising a plurality of subpixels, a respective subpixel of the plurality of subpixels comprising a first area, $n1$ number of second areas, and $n2$ number of third areas, the first area being between the $n1$ number of second areas and the $n2$ number of third areas, $n1 \geq 1$, and $n2 \geq 1$; and one or more processors configured to:

for displaying a first frame of image, control light emission of the respective subpixel to be limited in the first area, m1 number of the n1 number of second areas, and m2 number of the n2 number of third areas, 0≤m1≤n1, and 0≤m2≤n2; and for displaying a second frame of image, control light emission of the respective subpixel to be limited in the first area, m1' number of the n1 number of second areas, and m2' number of the n2 number of third areas, 0≤m1'≤n1, and 0≤m2'<n2, m1≠m1', and m2≠m2'.

13. The display apparatus of claim 12, wherein the one or more processors are further configured to:

determine a degree of image definition of a respective frame of image;

determine an adjustment factor at least partially correlated to the degree of image definition of the respective frame of image; and control values of m1, m2, m1', and m2' based on the adjustment factor.

14. The display apparatus of claim 12, wherein the one or more processors are further configured to:

determine a Fourier transformation on a respective frame of image to obtain a low frequency component and a high frequency component;

determine an adjustment factor at least partially correlated to a ratio of the high frequency component to the low frequency component; and control values of m1, m2, m1', and m2' based on the adjustment factor.

15. The display apparatus of claim 12, wherein the respective subpixel comprises a respective pixel driving circuit connected to a first light emitting element configured to emit light in the first area, n1 number of second light emitting elements configured to emit light in the n1 number of second areas, and n2 number of third light emitting elements configured to emit light in the n2 number of third areas; and the respective pixel driving circuit comprises (n1+n2) number of switches respectively configured to individually connect or disconnect a driving current from the n1 number of second light emitting elements and the n2 number of third light emitting elements.

16. The display apparatus of claim 12, further comprising a plurality of light modulating units, a respective light modulating unit of the plurality of light modulating units configured to modulate light emission in the respective subpixel;

wherein the respective light modulating unit comprises n1 number of second light modulators configured to individually allow or disallow light emission in the n1 number of second areas, and n2 number of third light modulators configured to individually allow or disallow light emission in the n2 number of third areas.

17. The display apparatus of claim 12, further comprising a camera configured to track a gaze of a user;

wherein the one or more processors are further configured to:

determine a gaze direction of the gaze of the user, and determine a local area of the display panel to which the gaze direction intersects, the local area being smaller than an area of the display panel;

determine a degree of image definition of a portion of a respective frame of image that is configured to be displayed in the local area;

determine an adjustment factor at least partially correlated to the degree of image definition of the portion of the respective frame of image; and control, for subpixels in the local area, values of m1, m2, m1', and m2' based on the adjustment factor.

18. The display apparatus of claim 12, further comprising a camera configured to track a gaze of a user;

wherein the one or more processors are further configured to:

determine a gaze direction of the gaze of the user, and determining a local area of the display panel to which the gaze direction intersects, the local area being smaller than an area of the display panel;

perform a Fourier transformation on a portion of a respective frame of image that is configured to be displayed in the local area, to obtain a low frequency component and a high frequency component;

determine an adjustment factor at least partially correlated to a ratio of the high frequency component to the low frequency component of the portion of the respective frame of image; and control, for subpixels in the local area, values of m1, m2, m1', and m2' based on the adjustment factor.

19. The display apparatus of claim 12, wherein the one or more processors are further configured to control values of m1, m2, m1', and m2' in a plurality of portions of a respective frame of image, respectively by:

determining, by one or more processors, a respective degree of image definition of a respective portion of the plurality of portions;

determining, by the one or more processors, a respective adjustment factor at least partially correlated to the respective degree of image definition of the respective portion; and controlling, for subpixels configured to display the respective portion, values of m1, m2, m1', and m2' based on the respective adjustment factor.

20. The display apparatus of claim 12, wherein the one or more processors are further configured to controlling values of m1, m2, m1', and m2' in a plurality of portions of a respective frame of image, respectively by:

performing, by the one or more processors, a Fourier transformation on a respective portion of the plurality of portions, to obtain a respective low frequency component and a respective high frequency component;

determining, by the one or more processors, a respective adjustment factor at least partially correlated to a ratio of the respective high frequency component to the respective low frequency component of the respective portion; and controlling, for subpixels configured to display the respective portion, values of m1, m2, m1', and m2' based on the respective adjustment factor.

* * * * *